US011445259B1

(12) United States Patent
Stratton et al.

(10) Patent No.: US 11,445,259 B1
(45) Date of Patent: Sep. 13, 2022

(54) PULL NOTIFICATION FROM SEPARATE APPLICATION

(71) Applicant: HULU, LLC, Santa Monica, CA (US)

(72) Inventors: Josh Stratton, Issaquah, WA (US); Tiffany Jiang, White Plains, NY (US); Elise Wang, Cerritos, CA (US); Ariela Ninka, Santa Monica, CA (US); Mingkui Liu, Playa Vista, CA (US); Zhuofeng Wu, Los Angeles, CA (US); Suneeta Puranik, Los Angeles, CA (US); Andres Montano, Seattle, WA (US); Austin Wignall, Los Angeles, CA (US); Jillian Abeyta, Los Angeles, CA (US); Josh Nelson, Woodland Hills, CA (US); Andrew Salituri, Seattle, WA (US); Dominic Hopton, Kirkland, WA (US)

(73) Assignee: HULU, LLC, Santa Monica, CA (US)

(*) Notice: Subject to any disclaimer, the term of this patent is extended or adjusted under 35 U.S.C. 154(b) by 0 days.

(21) Appl. No.: 17/242,029

(22) Filed: Apr. 27, 2021

(51) Int. Cl.
*H04N 21/431* (2011.01)
*H04N 21/472* (2011.01)
*H04N 21/478* (2011.01)
*H04N 21/81* (2011.01)
(Continued)

(52) U.S. Cl.
CPC ......... *H04N 21/478* (2013.01); *G06F 3/0481* (2013.01); *G06F 3/04842* (2013.01); *H04N 21/812* (2013.01)

(58) Field of Classification Search
None
See application file for complete search history.

(56) References Cited

U.S. PATENT DOCUMENTS

| 2009/0076902 A1* | 3/2009 | Grinsted | G06Q 30/0236 705/14.36 |
| 2013/0173765 A1* | 7/2013 | Korbecki | H04N 21/42209 709/221 |
| 2020/0356228 A1* | 11/2020 | Carney | H04N 21/8455 |

(Continued)

OTHER PUBLICATIONS

Jon Lafayette "Hulu Brings E-Commerce to Living Room TV Screens", https://www.nexttv.com/news/hulu-brings-e-commerce-living-room-tv-screens-165482, 7 pages, dated May 3, 2017.

(Continued)

*Primary Examiner* — Brian T Pendleton
*Assistant Examiner* — Jean D Saint Cyr
(74) *Attorney, Agent, or Firm* — Kwan & Olynick LLP

(57) ABSTRACT

In some embodiments, a method receives a request for supplemental content to be displayed in a break of a video being played using a first instance of an application at a first client device. An account is associated with the first instance of the application. A plurality of contact options is retrieved for the account and ranked. The method outputs the plurality of pull notification options to the first client device based on the plurality of contact options where the plurality of pull notification options are displayed during the break. A pull notification option causes a pull notification to be sent to a second instance of the application running on a second client device and the pull notification is configured to be output by the second instance of the application on the second client device.

20 Claims, 9 Drawing Sheets

(51) Int. Cl.
*G06F 3/04842* (2022.01)
*G06F 3/0481* (2022.01)

(56) References Cited

U.S. PATENT DOCUMENTS

2021/0019575 A1* 1/2021 Ouimet .................... G06N 3/08
2021/0295264 A1* 9/2021 Park ...................... G06Q 10/10

OTHER PUBLICATIONS

"Interactive Living Room",https://advertising.hulu.com/ad-products/interactive-living-room/, 1 page, Apr. 27, 2021.

* cited by examiner

PULL NOTIFICATION FROM SEPARATE APPLICATION

BACKGROUND

A user watching a video may sometimes see advertisements that the user may want to engage with further. On a mobile device or a personal computer, a user may easily select the advertisement to continue browsing on another destination, such as the advertiser's website, or perform other actions, such as clip a coupon or receive an offer. However, when watching the video in the living room on a television, the user often does not have an option to easily explore the advertisement further.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
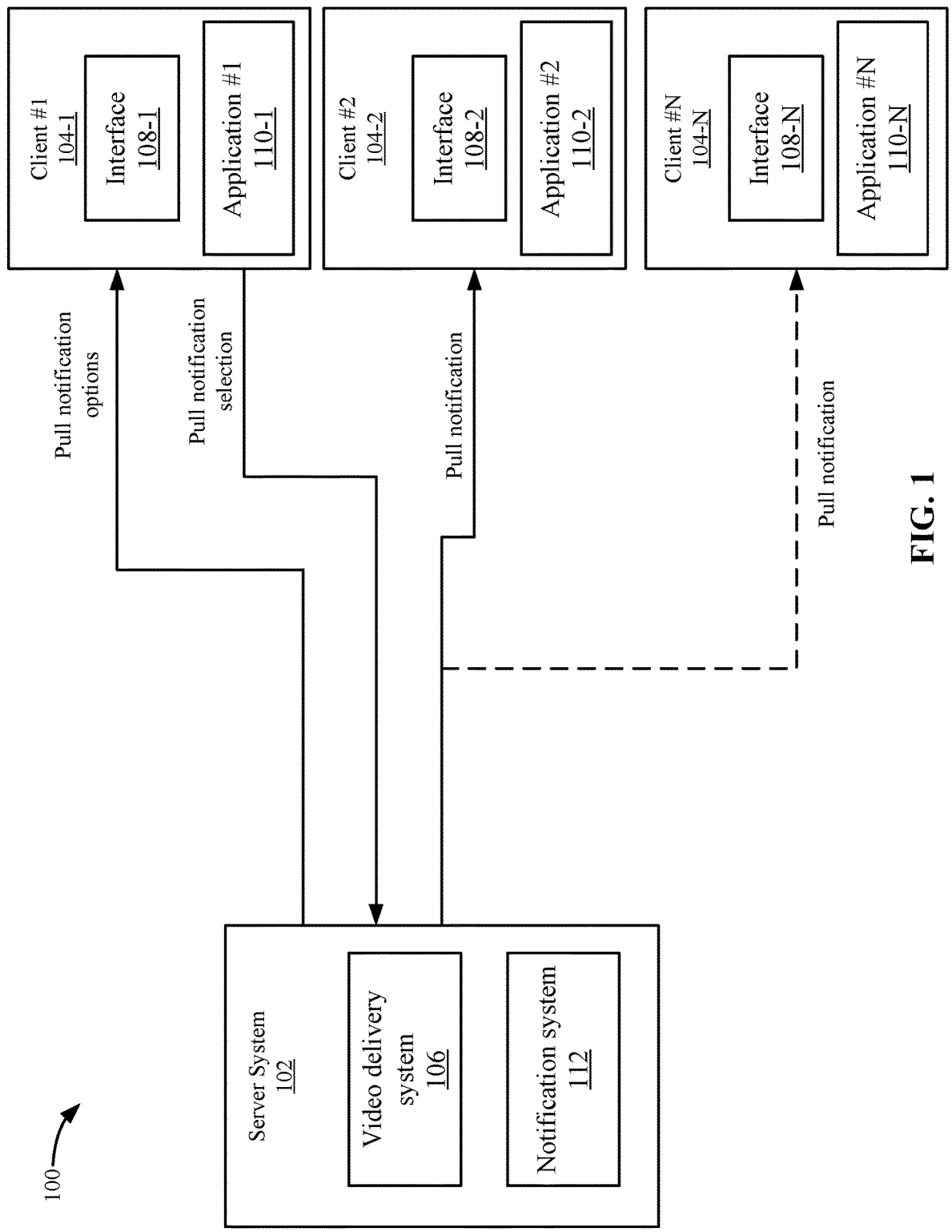
FIG. 1 depicts a simplified system for providing pull notifications according to some embodiments.

Described herein are techniques for a notification system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system allows a pull notification to be sent from one application to another application. The pull notification may be initiated by a user account and personalized to indicate a device associated with the user account. In contrast, a push notification may be sent to many devices at the same time without a specific request from a user account at a specific point in time. For example, an application running on a living room device may display a video in which supplemental content is displayed within the video, such as an advertisement. The supplemental content may allow a user to select an option to send a pull notification to another application running on another device. For example, the living room device may display pull notification options that are personalized to the user. To determine the pull notification options, the system may determine contact options for the user, such as devices in which the user is logged on, an account email, etc. The system may rank the contact options based on the likelihood that the user may select them. Then, pull notification options that are associated with the respective contact options are displayed with the supplemental content.

If sending a pull notification to a second application is selected, such as an application running on a second device, the system receives the selection and sends a pull notification to the second application that is running on the second device. The second application receives the notification and can display or surface the pull notification using notification settings on the second device. The pull notification leverages the application that is running on the second device, which is different from using a text message to contact the user. Using the application provides many advantages. For example, the phone number of the user does not need to be known. That is, multiple users may be using an account on the system, but not all users may provide their phone number. However, the users using the account may download the application to another device. Accordingly, pull notifications can be sent to the second device when enabled. Further, the notification does not use the text messaging channels to send the message. Rather, a data connection to the application may be used to send the pull notification. Accordingly, the system allows a user to engage with supplemental content on another device that may include capabilities to view the engagement content.

The pull notification is requested by the user, which may be different from a push notification that is pushed to a user without the user request for that push notification. In this case, a request from the user is received on another device, and the request specifies that the user wants to receive a notification on the second device. Accordingly, the pull notification is pull-based instead of push-based in that a user requests the notification, instead of being pushed the notification without asking. This reduces the intrusion on the user as the user has requested to receive the pull notification. The pull nature of the notification may increase the engagement with the pull notification because the user has requested the pull notification and may be more likely to select the pull notification to receive engagement content. As discussed above, it is hard for the user to engage with supplemental content when the instances are played on a television compared to another device, such as a mobile device. The television hardware may lack control input options as compared to a mobile device, lack of a browser on hardware, not include an email client, messaging service, etc. The pull notification provides improved functionality for the television to allow it to offer features not supported by regular hardware.

System Overview

FIG. 1 depicts a simplified system 100 for providing pull notifications according to some embodiments. System 100 includes a server system 102 and client #1 104-1, client #2 104-2, ..., client #N 104-N. System 100 may include any number of servers in server system 102 and clients 104. Clients 104 may include smartphones, living room devices, tablet devices, personal computers, etc. Server system 102 may include one or more computing devices, which may perform the functions described.

Server system 102 may include a video delivery system 106 that can deliver videos to clients 104. In some embodiments, video delivery system 106 may communicate with content delivery networks (CDNs) (not shown) that deliver the videos to clients 104.

In some embodiments, video delivery system 106 may provide an instance of an application 110 (e.g., application #1 110-1, application #2 110-2, ... application #N 110-N) that is installed on clients 104. Application 110 may provide functionality to have videos delivered to clients 104. For example, application 110 provides a user interface in which a user can browse videos to request on-demand or live. Then, applications 110 may receive videos from video delivery system 106. For example, clients 104 may include a media player that is configured to play a video on a user interface 108 (e.g., interface 108-1, interface 108-2, ..., interface 108-N). An instance of an application 110 may be provided by video delivery system 106. The instance may operate differently on different types of clients 104, such as by providing different functions, but the instances are from a same provider of video delivery system 106.

The video may include what is referred to as "main content", which may be the content of the video that is requested, such as the content of a show, movie, etc. Within the main content, supplemental content may be requested and displayed. The supplemental content may include advertisements, promotions, recommendations, etc. The supplemental content is content that is added to the main content, such as by video delivery system 106 or a separate server, such as an advertisement server. The supplemental content may not be provided by the main content provider.

A notification system 112 may detect when supplemental content may be displayed in the video, such as a break of the main content. Notification system 112 may be implemented using different services that perform the functions described. Then, notification system 112 determines pull notification options for the supplemental content. Pull notification options may include different contact options in which a user may be contacted to receive engagement content for the supplemental content. The pull notification options may provide options to receive a notification via an application 110 running on another client 104, receive an email, and/or use another client 104 to request the engagement content, such as scan a code. Other options may also be appreciated. These contact options may use different communication channels to deliver the pull notifications, such as a data channel to another application 110 on another client 104, an email channel, etc. In some embodiments, an account using video delivery system 106 may include multiple profiles. The profiles may be associated with different entities, such as users. Accordingly, the pull notification options may include options for different profiles. For example, a first pull notification option may be for a user #1 on client #2 104-2 and a second pull notification may be for a user #2 on client #N 104-N. Thus, the profiles may be associated with different clients 104. The email may be associated with the email provided for the account. In some embodiments, a single email may be associated with the account, but multiple emails may be used. The scannable code may be a generic QR code that may be used across multiple accounts. However, the code may be personalized to the account.

Figure 2:
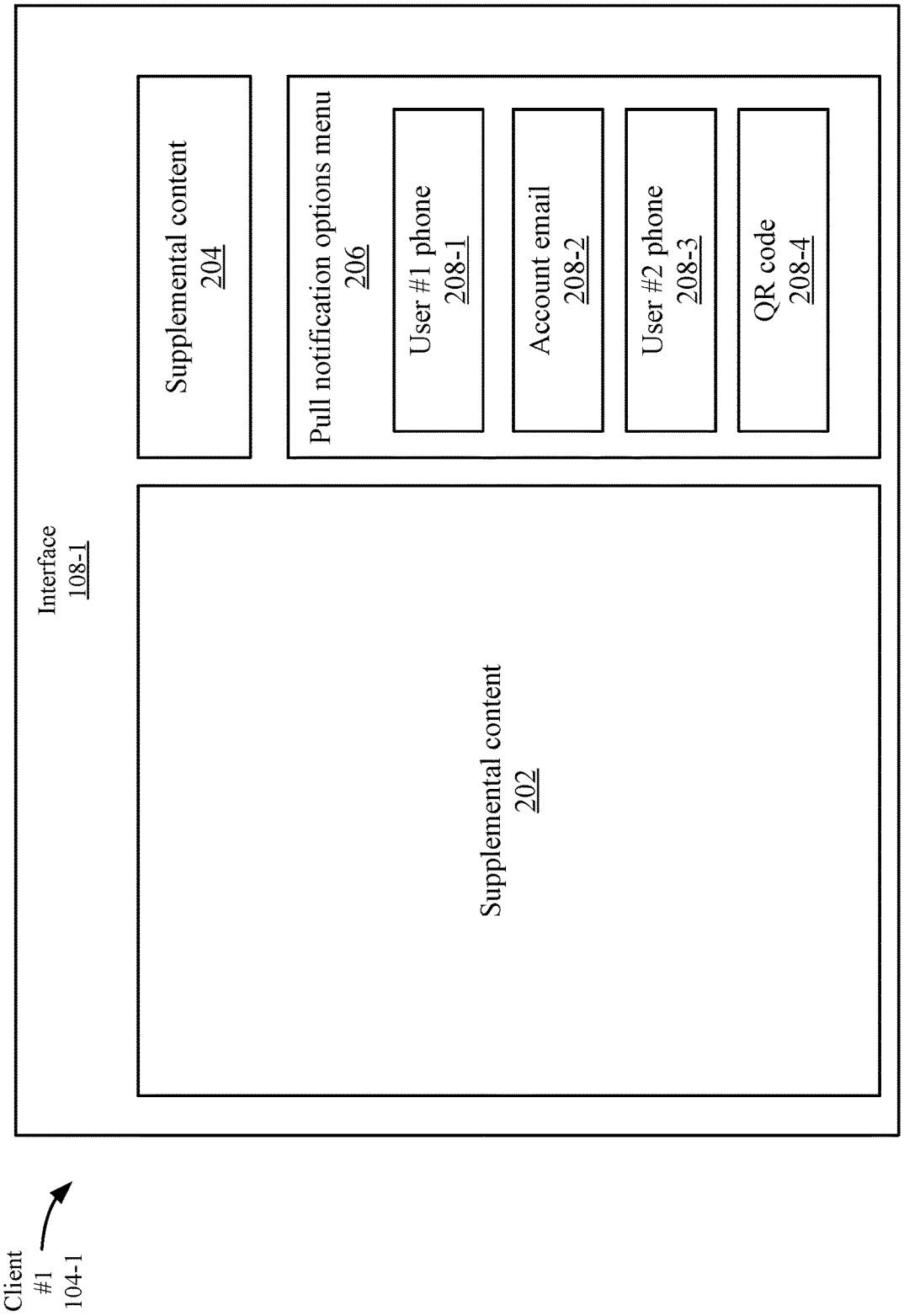
FIG. 2 depicts an example of a client #1 according to some embodiments.

FIG. 2 depicts an example of client #1 104-1 according to some embodiments. Client #1 104-1 may be playing main content of a video on interface 108-1. During a break in the main content, information may be displayed that may include supplemental content 202 and supplemental content 204. In some embodiments, supplemental content 202 may be an advertisement from an advertiser, which may be a video that is being played during a break in the main content. Supplemental content 204 may be an additional advertisement, such as an offer, that is static during the playing of supplemental content 202. For example, supplemental content 204 may display additional information about the advertiser, such as a targeted offer to the user. Although supplemental content 202 and supplemental content 204 are discussed, supplemental content may be displayed in different ways, and do not need to include a video (e.g., an image may be used) or include two instances of supplemental content.

Pull notification options menu 206 includes multiple pull notification options at 208-1 to 208-4 that are selectable. That is, a selection of one of these options may be received on interface 108-1, such as via a remote control, touch, voice input, etc. Although these pull notification options are shown, other pull notification options may be appreciated, such as a voice channel notification (e.g., a phone call).

A pull notification option at 208-1 may be associated with a contact option that will send a notification to a first profile that is associated with a user #1 device (e.g., a phone, tablet, etc.). The user #1 device may be associated with another client, such as client #2 104-2. Another pull notification option at 208-2 may be associated with an account email. The account email may be an email address, such as that was received for the account, a newly supplied email, etc. Another pull notification option at 208-3 may be associated with a user #2 device (e.g., phone, tablet, etc.). The user #2 device may be associated with a second profile that is associated with the account and be a different device of the user #1 device. The second profile may be for a different user or the same user; however, the profile may be associated with a different type of client than the first profile. In this case, a user #2 device may be associated with a client #3 104-3. Another pull notification option at 208-4 may be associated with a code, such as with a quick response (QR) code. The QR code may be a code that is displayed on interface 108-1. Then, a client 104 (other than client #1 104-1) may scan the QR code and that other client 104 is redirected to engagement content associated with the supplemental content. The QR code may be personalized to the account or may be generic across multiple accounts.

Client #1 104-1 may receive a selection of one of the pull notification options. For example, a navigation from a user to one of the pull notification options may be received on interface 108-1. Then, a selection of one of the pull notification options is received from the user. Application #1 110-1 may provide the pull notification selection to server system 102. The pull notification may indicate which contact option has been selected to receive the pull notification. Notification system 112 then determines information that is used to send the pull notification. For instance, different pull notifications may require different communication channels that are used to send the pull notification. For example, notification system 112 may send a pull notification to application #2 110-2 on client #2 104-2. The pull notification may be different from a text message, which is sent to the phone number of client #2 104-2. In some embodiments, the pull notification uses a data connection between application #2 110-2 and server system 102. The use of the data connection may be different from sending a message that would not interact with application #2 110-2, such as a short message system (SMS) message to a phone number. However, sending an SMS message may be one of the pull notification options that a user can select.

Figure 3:
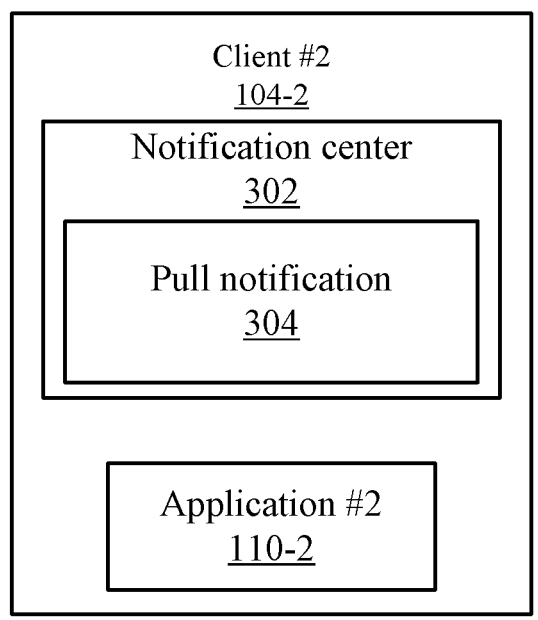
FIG. 3 depicts an example of a pull notification according to some embodiments.

FIG. 3 depicts an example of a pull notification according to some embodiments. The pull notification may be displayed on a different client from the client that the pull notification is selected. In this example, client #2 104-2 is displaying the pull notification. In some examples, application #2 110-2 receives the pull notification from notification system 112 and can display notifications in a notification center 302 based on settings at client #2 104-2. Application #2 110-2 may be running in a state that allows notifications, such as in the background, actively on client #2 104-2, or inactively, but with push notifications enabled. Also, the account may be logged into application #2 110-2 and have enabled notifications. Application #2 110-2 then displays a notification on interface 108-2. The notification may be displayed in a notification center for client #2 104-2, displayed on a lock screen as a banner, etc. In some embodiments, notification center 302 may be a dedicated notification area to display notifications. Also, notification center 302 may display notifications as pop-up messages, banners, etc. For example, if a client #2 104-2 is on a lock screen, notification center 302 may display a notification on the lock screen. The pull notification may also be stored in another dedicated notification area such that the pull notification can be accessed at a later time.

As shown, notification center 302 is displaying a pull notification 304. Once displayed, a selection of pull notification 304 may be received. In response to a selection of pull notification 304, application #2 110-2 may be opened because application #2 110-2 outputted the pull notification and needs to be opened to perform an action associated with the pull notification. That is, application #2 110-2 is responsible for processing the notification when the notification is selected. Then, application #2 110-2 may perform the action, such as by re-directing client #2 104-2 to the engagement content. The engagement content may be a website in a web browser, a destination page, another application, etc. In some embodiments, the company associated with supplemental content 202 or supplemental content 204 may specify the action to be performed, such as opening the company's website, or opening an offer for the user.

The following will describe the pull notification process in more detail.

Pull Notification Ranking

Figure 4:
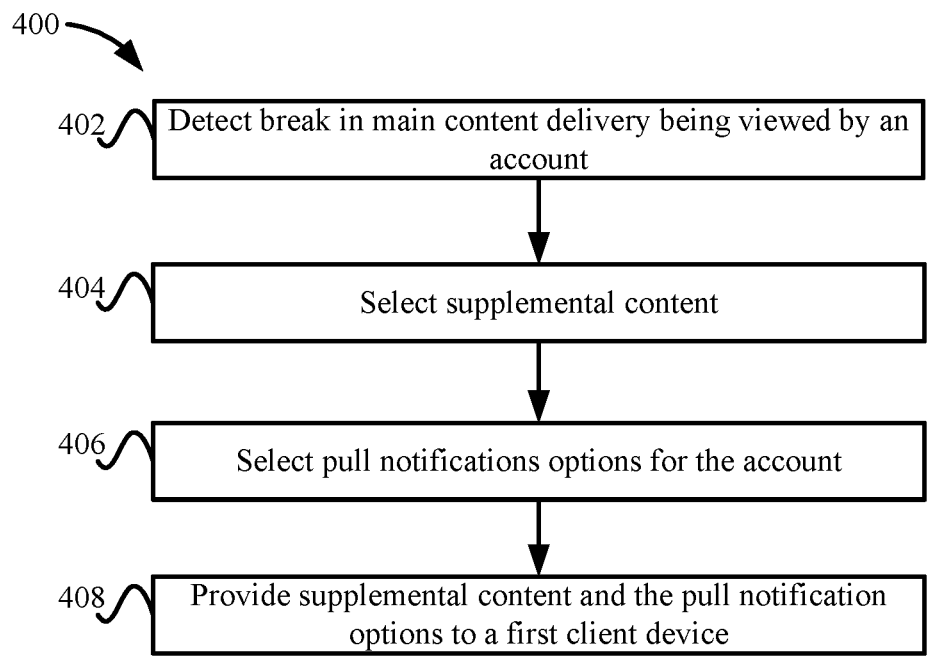
FIG. 4 depicts a simplified flowchart of a method for ranking pull notification options according to some embodiments.

When it is time to provide pull notifications, notification system 112 may retrieve and rank pull notification options that are available. FIG. 4 depicts a simplified flowchart 400 of a method for ranking pull notification options according to some embodiments. At 402, notification system 112 detects a break in the delivery of the main content that is being viewed by an account. For example, notification system 112 may receive an indication from video delivery system 106 that a break is upcoming. Also, client #1 104-1 may send a request to server system 102 for supplemental information to be displayed during the break.

At 404, video delivery system 106 selects supplemental content for the break. Although video delivery system 106 is described as selecting the supplemental content, other entities may be used, such as an ad server, a third party server, etc. The supplemental content may be targeted to the account that is being used to view the main content, but different methods of selecting the supplemental content may be appreciated.

At 406, notification system 112 selects pull notification options for an account. The pull notification options may be based on retrieved contact options that are available to communicate a pull notification to the account. The process will be described in more detail below.

At 408, notification system 112 outputs the supplemental content and the pull notification options to client #1 104-1. It will be understood that supplemental content may be provided to client #1 104-1 separately from the pull notification options. However, both the supplemental content and pull notification options may be provided together to client #1 104-1.

Figure 5:
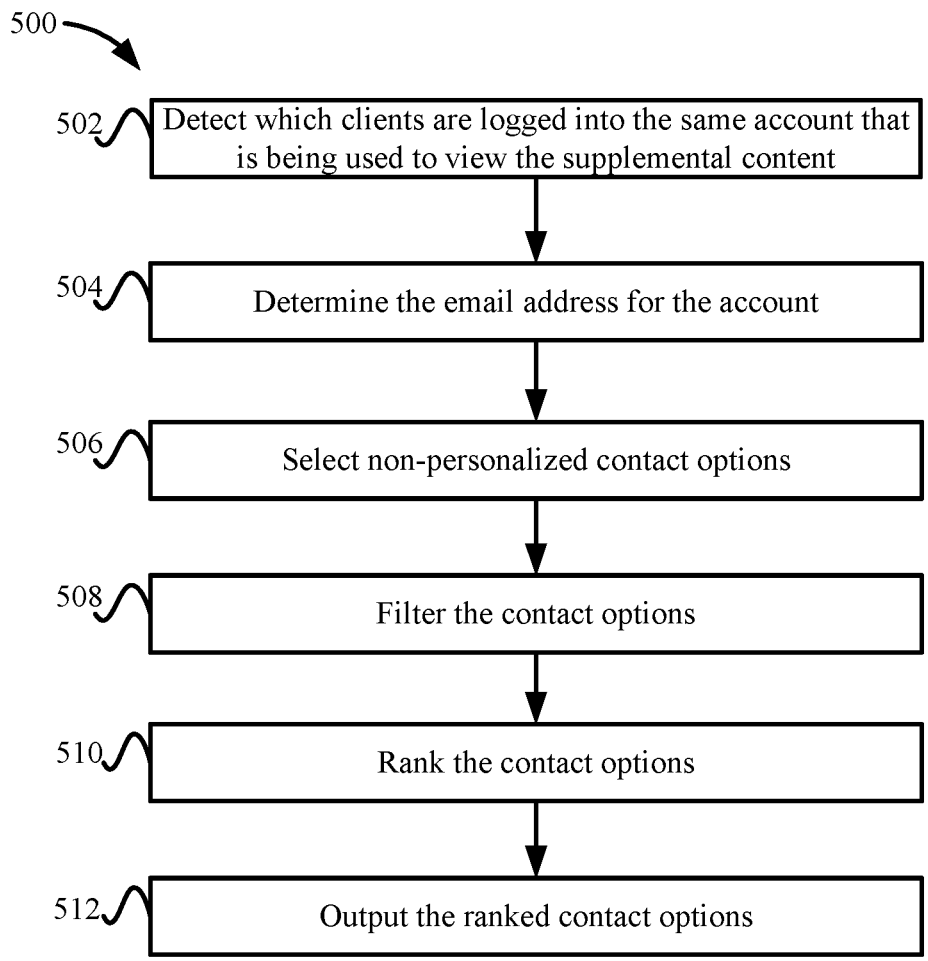
FIG. 5 depicts a simplified flowchart of a method for selecting a ranking of pull notification options according to some embodiments.

The following will describe the selection of the pull notification options in more detail. FIG. 5 depicts a simplified flowchart 500 of a method for selecting a ranking of pull notification options according to some embodiments. At 502, notification system 112 detects and retrieves which clients 104 are logged into the same account that is being used to view the supplemental content. Notification system 112 may retrieve information on profiles for the same account that are logged into clients 104 (e.g., mobile devices). The information that may be retrieved includes the name of clients 104, the date that clients 104 were last active, which profile was last used, the type of profile, etc. Video delivery system 106 may have unique insight into information for the accounts. For example, video delivery system 106 may have an account that has an application 110 installed on multiple different clients 104, such as televisions, smartphones, tablet devices, etc. Additionally, video delivery system 106 includes information from profiles that may provide the state of each application 110 on clients 104, such as whether the account or profile is actively logged onto an application 110 on a client 104. For example, the account may be used on multiple clients 104 and may be logged into different instances of application 110. Further, different profiles in the account may log onto an application 110 and video delivery system 106 may determine the login history, such as the last profile to access an application 110 on a client 104 or the primary profile that uses an application 110 on a client 104.

At 504, notification system 112 determines an email address for the account. The email address may be associated with all the profiles of the account, or multiple email addresses may be associated with different profiles of the account. In some embodiments, the email address that is associated with the profile being used to view the supplemental content is retrieved.

At 506, notification system 112 selects non-personalized contact options. Non-personalized contact options may not be based on the account that is being used to view the supplemental content. For example, a non-personalized contact option may be a QR code that is displayed on interface 108-1 and requires a user to scan the code. This code may be scanned by any client and that client does not need to include an application 110 or be used by the account that is viewing the video.

At 508, notification system 112 filters the contact options. The filtering may be performed at different levels. For example, different systems that retrieve the contact options may perform respective filtering, or the filtering may be centralized. Notification system 112 may filter the retrieved options based on different criteria. For example, some clients 104 may not have notifications enabled, and these options are filtered. Other rules may also be used, such as when options do not meet personalized criteria, such as a client 104 is not associated with an undesirable user (e.g., a child).

At 510, notification system 112 ranks the contact options. Notification system 112 may rank the contact options in different ways. In some embodiments, notification system 112 may predict which contact options may be more likely to be engaged with by the account. In some embodiments, notification system 112 may perform the ranking based on which profile is being used and also access history (e.g., times when profiles accessed application 110). For example, notification system 112 may receive device usage history and determine which profiles have accessed which clients 104 at which time. The profiles may be evaluated based on if the profiles are different from the profile that is being used to view the supplemental content. The time may be evaluated based on a last active time (e.g., last login) of the profile on application 110.

In some examples, a first ranked profile may be the profile that is actively logged into a client #2 104-2 and is the same profile that is viewing the supplemental content (and main content) on client #1 104-1. Then, a last active profile (second profile) on a client #N 104-N that may be different from the first profile that is being used to view the supplemental content may be ranked after the first profile (e.g., ranked second). The secondary rank may be based on the last active timestamp for the profiles associated with the contact options. For example, if user #1 is watching the supplemental content using application #1 110-1 under a profile "user #1", and the same profile was used on a client #2 104-2 very recently and also on a client #3 104-3 a long time ago, then notification system 112 ranks client #2 104-2 first due to being more recently used. In another situation, if the most-recently active profile for the account is for a profile "user #2" on client #2 104-2, which is different from the profile of user #1, notification system 112 may rank client #3 104-3 first because the profile "user #1" was last used on client #3 104-3 and this is the same profile that is watching the supplemental content. The user #2 profile on client #2 104-2, which may be the most recently used profile, may be ranked after client #3 104-3. Accordingly, notification system 112 may prioritize clients 104 that matched the profile watching the supplemental content first, and then determine another profile that was last actively used second. If one of the above options is not found, such as user #1 has never used another client 104, notification system 112 may rank the user #2 profile first without an option for a client 104 for the user #1 profile. The above contact options may be personalized to an account. Accordingly, different accounts may see different pull notification options to different clients 104.

In some embodiments, notification system 112 may vary the contact options in a way to promote engagement. In some embodiments, notification system 112 ranks the first ranked client 104 option first. Then, notification system 112 ranks the account email contact option second. If there is a second ranked client device 104, notification system 112 ranks the second ranked client device 104 third. Then, the QR code contact option may be shown thereafter. It is noted that other options may be provided in the ranked list or contact options may not exist or be removed. For example, if no clients 104 satisfy the requirements, then notification system 112 provides only the email and the QR code, with the email shown first and the QR code shown second. Also, as will be discussed below, client 104 may also perform a ranking of the pull notification options, which may change the ranking of notification system 112 or may be performed in place of notification system 112 performing at least part of the ranking. For example, notification system 112 may not rank the contact options at all, may rank them, but client 104 may alter them, may rank some of the contact options, etc. Notification system 112 may rank clients 104 and also provide the email and code contact options. Sometimes the email and code contact options may not be ranked with clients 104, such as the email and code contact options are included after clients 104.

In some embodiments, notification system 112 may use a prediction network to determine which contact option will be the one that is most likely engaged. For example, notification system 112 may receive input for all the contact options, analyze the input using a prediction network, and determine the ranking automatically.

Once the ranking is generated, at 512, notification system 112 outputs the ranked contact options. Notification system 112 may generate pull notifications for the associated contact options. The pull notifications may indicate information for the associated contact option, such as identifying the user profile and client 104 for a pull notification.

Pull Notification Display on Client #1

Figure 6:
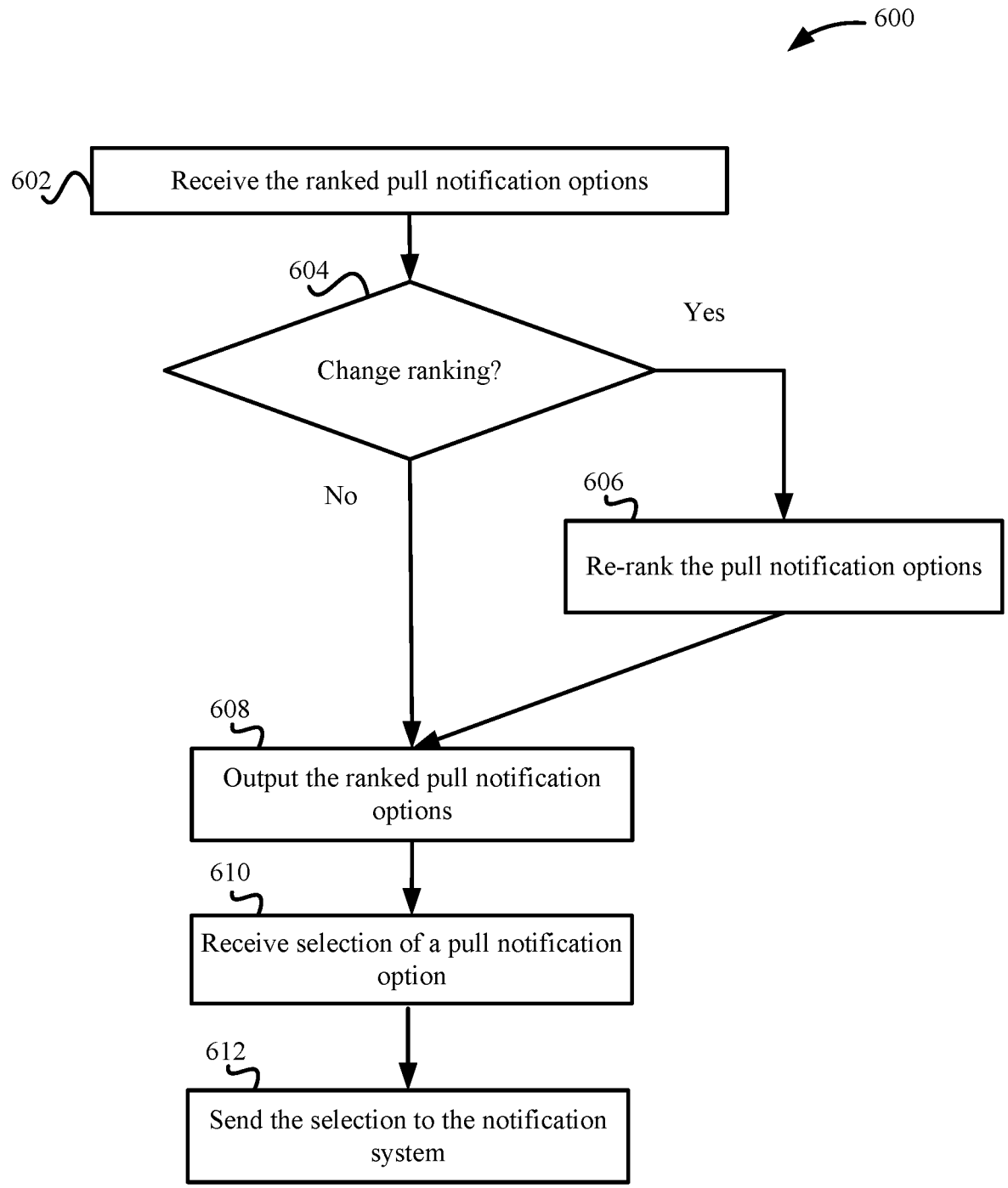
FIG. 6 depicts a simplified flowchart of a method for displaying the pull notification options according to some embodiments.

FIG. 6 depicts a simplified flowchart 600 of a method for displaying the pull notification options according to some embodiments. At 602, client #1 104-1 receives the ranked pull notification options. Each contact option may be associated with a pull notification.

At 604, client #1 104-1 may determine whether to change the ranking. If the ranking should be changed, at 606, client #1 104-1 may re-rank the pull notification options. The re-ranking may be based on settings at client #1 104-1. For example, client #1 104-1 may perform a similar ranking as described above with respect to notification system 112. If notification system 112 ranked clients 104 that are included in the different pull notifications and then included the email pull notification option and the QR code notification option, client #1 104-1 may rank the first ranked profile and client combination as the first option in pull notifications option menu 206, the email pull notification as the second option, another profile and client combination as the third option, and then the QR code as the fourth option. Other options may also be used, such as client #1 104-1 may promote a specified profile as the first ranked option.

After the re-ranking or if no re-ranking is performed, at 608, client #1 104-1 outputs the ranked pull notification options in pull notification options menu 206. For example, client #1 104-1 outputs the ranked pull notification options along with supplemental content 202 and supplemental content 204.

At 610, client #1 104-1 may or may not receive a selection of a pull notification option. If no selection is received, client #1 104-1 may not perform any actions for the pull notifications. However, at 610, client #1 104-1 may receive a selection of a pull notification option. Then, at 612, application #1 110-1 of client #1 104-1 sends the selection to notification system 112. The information that is sent for the selection may include the information needed to process the pull notification, such as an identifier for a client (e.g., client #2 104-2, client #N 104-N, etc.) that is associated with the pull notification, an identifier for an email address, information for the engagement content, etc.

Pull Notification Selection System Processing

Figure 7:
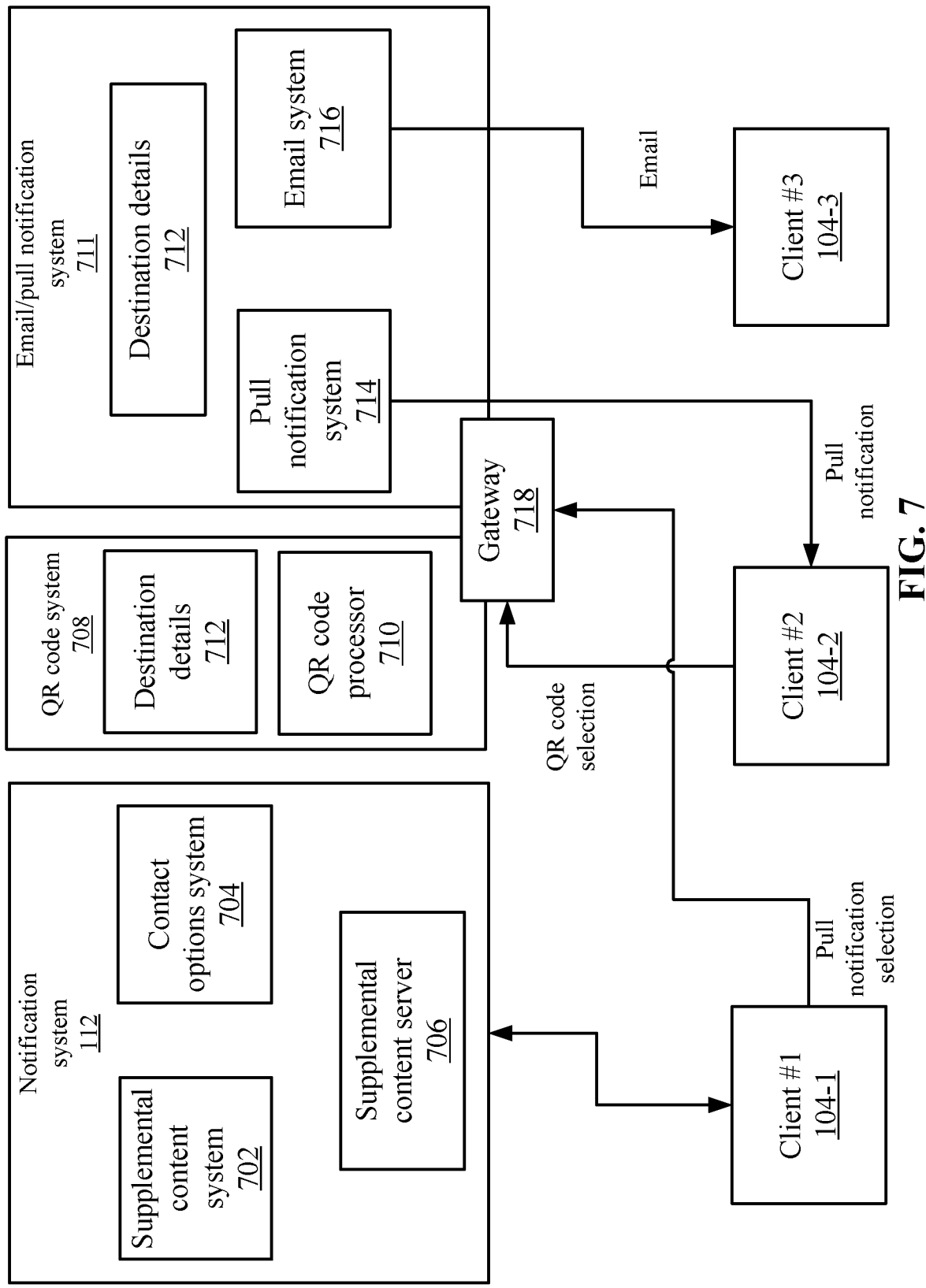
FIG. 7 depicts an example of processing the pull notifications according to some embodiments.

FIG. 7 depicts an example of processing the pull notifications according to some embodiments. Notification system 112, a QR code system 708, and an email/pull notification system 711 interact with clients 104, such as client #1 104-1, client #2 104-2, and client #3 104-3. It is noted that functions described for notification system 112, a QR code system 708, and an email/pull notification system 711 may be performed by one system or distributed to other systems.

Client #1 104-1 may be viewing the main content and the supplemental content. When client #1 104-1 reaches the break to display the supplemental content, client #1 104-1 sends a request to server system 102. It is noted that entities shown notification system 112 may be found outside of notification system 112 and functionalities may be distributed among different devices. Notification system 112 includes a supplemental content server 706 that may retrieve a list of supplemental content. For example, a supplemental content system 702 may select the supplemental content for this break, such as based on characteristics of the account being used. In some examples, supplemental content server 706 may determine one or more advertisements based on characteristics of the user account.

A contact options system 704 selects the available contact options for the account, such as clients 104 that have been used by the same account, an email address for the account, etc. Different entities may be used to retrieve the contacts options. Notification system 112 then sends the list of supplemental content back to client #1 104-1 in addition to the pull notification options. As discussed above, notification system 112 may rank and filter the pull notifications options, but that is not necessary.

Upon display of the pull notification options, client #1 104-1 may receive a selection of a pull notification. Client #1 104-1 may determine information for the pull notification and send the information for the selection to a gateway 718. Gateway 718 may be a device that is configured to receive selections from clients 104.

Instead of selecting the pull notification with client #1 104-1, a different client, such as client #2 104-2, may be used to select one of the pull notifications, such as the QR code. For example, client #2 104-2 scans the QR code and outputs a notification that can be selected. Then, client #2 104-2 sends the QR code selection to gateway 718. The output selection may have a link in which client #2 104-2 sends the selection.

Depending on the type of pull notification selection, gateway 718 communicates with different systems. For example, if the QR code is selected, a QR code system 708 processes the QR code using QR code processor 710 to determine information that is embedded in the QR code. For example, the embedded information may be associated with the engagement content. Destination details 712 may provide information for the engagement content, such as a uniform resource locator (URL) for the engagement content. Gateway 718 may then send the engagement content back to client #2 104-2.

If the pull notification is for a different client (e.g., client #2 104-2, pull notification system 714 may determine destination details 712 for the pull notification. For example, pull notification system 714 receives information for the destination details from client #1 104-1 and uses the information to retrieve information for the engagement content (e.g., a link). Then, pull notification system 714 sends the pull notification with the information for the engagement content to client #2 104-2. Client #2 104-2 may display the pull notification using application #2 110-2.

Email system 716 may process a pull notification request for an email notification. The pull notification request may include the email address or identify the account such that email system 716 can retrieve the email. For example, email system 716 may generate an email that includes the information for the engagement content. Then, email system 716 sends the email to the email account, which may be displayed on any client, such as client #2 104-2 or client #3 104-3. It is noted the email may be displayed on client #1 104-1 if that client can receive emails. If the information for the engagement content in the email notification is selected, client #3 104-3 may be re-directed based on the information, such as to engagement content of a site.

Pull Notification Selection Process

Figure 8:
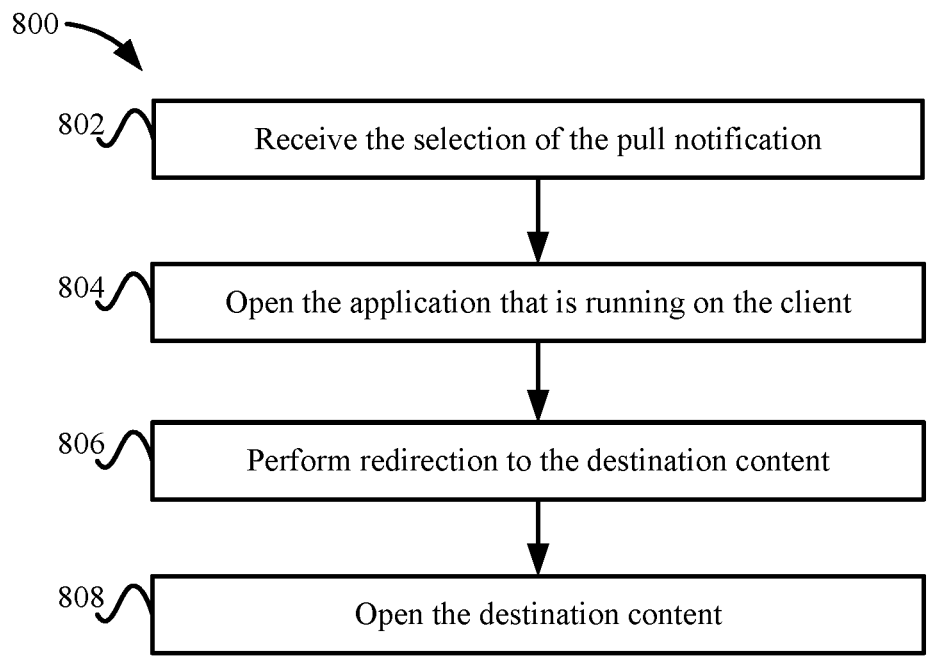
FIG. 8 depicts a simplified flowchart of a process following the selection of a pull notification according to some embodiments.

FIG. 8 depicts a simplified flowchart 800 of a process after the selection of a pull notification according to some embodiments. In some embodiments, the pull notification is displayed in the notification center of client #2 104-2 by application 110-2. At 802, client #2 104-2 receives the selection of the pull notification. For example, the pull notification may be selected using different methods (e.g., touch).

At 804, client #2 104-2 opens application 110-2. Because application #2 110-2 displayed the pull notification on client #2 104-2, the selection of the pull notification opens application #2 110-2 on client #2 104-2; however, application #2 110-2 may only briefly be opened. Then, application #2 110-2, at 806, can perform re-direction to the engagement content that is associated with the pull notification. For example, application #2 110-2 uses a link to the engagement content to perform the re-direction.

At 808, client #2 104-2 opens the engagement content. For example, client #2 104-2 may send a request to a server using the link. Then, client #2 104-2 receives the engagement content and displays the engagement content, such as on a web browser.

Other pull notifications may be processed differently. For example, the QR code may cause a notification to be displayed on client #3 104-3. A selection of the notification may cause a re-direction to display the engagement content, such as on a web browser. For the email notification, a selection of the link in the email may be received, and the selection causes the engagement content to be displayed.

Statistics on whether the user engaged with the pull notification may also be stored at server system 102. Further, any information from the engagement content may also be saved and tracked.

CONCLUSION

Accordingly, pull notification options are provided to clients 104 that do not have the capability to display the engagement content easily thus providing functionality options that are not supported by the hardware. The pull notifications that are provided may be personalized to the account being used to view the supplemental content. The ranking of the pull notification options may further improve the engagement by ranking the pull notifications that may most likely be used first. Also, providing the pull notification options may improve the process because an account may not have been able to access the engagement content on the client that is viewing the supplemental content without the pull notification.

Example Embodiments

In some embodiments, a method comprising: receiving, by a computing device, a request for supplemental content to be displayed in a break of a video being played using a first instance of an application at a first client device, wherein an account is associated with the first instance of the application; retrieving, by the computing device, a plurality of contact options for the account; ranking, by the computing device, the plurality of contact options; and outputting, by the computing device, the plurality of pull notification options to the first client device based on the plurality of contact options, the plurality of pull notification options being displayed during the break, wherein: a pull notification option causes a pull notification to be sent to a second instance of the application running on a second client device, and the pull notification is configured to be output by the second instance of the application on the second client device.

In some embodiments, the method further comprising: receiving a selection of the pull notification option; and selecting engagement content for the pull notification option.

In some embodiments, the second instance of the application is opened when the pull notification is selected, and the second instance of the application causes an output of engagement content that is associated with the supplemental content.

In some embodiments, the plurality of contact options include an email address for the account and a scannable code that is not associated with the account.

In some embodiments, a first profile for the account is using the first instance of the application, and the first profile for the account is using the second instance of the application.

In some embodiments, the plurality of contact options comprise: a first profile that is using one of the first instance of the application and the second instance of the application, and a second profile that is using another one of the first instance of the application and the second instance of the application.

In some embodiments, ranking the plurality of pull notification options comprises: ranking a first pull notification option for a first profile first, wherein the first profile is using the first instance of the application.

In some embodiments, ranking the plurality of pull notification options comprises: ranking a second pull notification option for a second profile after the first pull notification option, wherein the second profile is using a second instance of the application on a third client device.

In some embodiments, ranking the plurality of pull notification options comprises: ranking a third pull notification option for an email address of the account after the first pull notification option and before the second pull notification option.

In some embodiments, the first instance of the application used the first instance of the application after the second profile used the second instance of the application.

In some embodiments, ranking the plurality of pull notification options comprises: ranking a fourth pull notification option for scannable code after the second pull notification option.

In some embodiments, ranking the plurality of pull notification options comprises: ranking a first pull notification option for a first profile first, wherein the first profile is using the first instance of the application.

In some embodiments, ranking the plurality of pull notification options comprises: ranking a second pull notification option for a second profile after the first pull notification option, wherein the second profile is using a second instance of the application on a third client device.

In some embodiments, a non-transitory computer-readable storage medium comprising instructions, that when executed, control one or more computer processors to be operable for: receiving a request for supplemental content to be displayed in a break of a video being played using a first instance of an application at a first client device, wherein an account is associated with the first instance of the application; retrieving a plurality of contact options for the account; ranking the plurality of contact options; and outputting the plurality of pull notification options to the first client device based on the plurality of contact options, the plurality of pull notification options being displayed during the break, wherein: a pull notification option causes a pull notification to be sent to a second instance of the application running on a second client device, and the pull notification is configured to be output by the second instance of the application on the second client device.

In some embodiments, a method comprising: sending, by a computing device, a request for supplemental content to be displayed in a break of a video being played using a first instance of an application at a first client device, wherein an account is associated with the first instance of the application; receiving, by the computing device, a plurality of pull notification options for the account, wherein the plurality of pull notification options are based on a plurality of contact options; ranking, by the computing device, the plurality of pull notification options; outputting, by the computing device, the plurality of pull notifications during the break; receiving, by the computing device, a selection of a pull notification option; and sending, by the computing device, the selection of the pull notification option to a system, wherein: the system uses a contact option associated with the pull notification option to send a pull notification to a second instance of the application running on a second client device, and the pull notification is configured to be output by the second instance of the application on the second client device.

In some embodiments, ranking the plurality of pull notifications comprises: changing an initial ranking of the plurality of pull notifications.

In some embodiments, ranking the plurality of pull notifications comprises: ranking a first pull notification for a first profile first, wherein the first profile is using the first instance of the application.

In some embodiments, ranking the plurality of pull notifications comprises: ranking a second pull notification for a second profile after the first pull notification, wherein the second profile is using a second instance of the application on a third client device.

In some embodiments, ranking the plurality of pull notifications comprises: ranking a third pull notification for an email address of the account after the first pull notification and before the second pull notification.

In some embodiments, ranking the plurality of pull notifications comprises: ranking a fourth pull notification for scannable code after the second pull notification.

System

Figure 9:
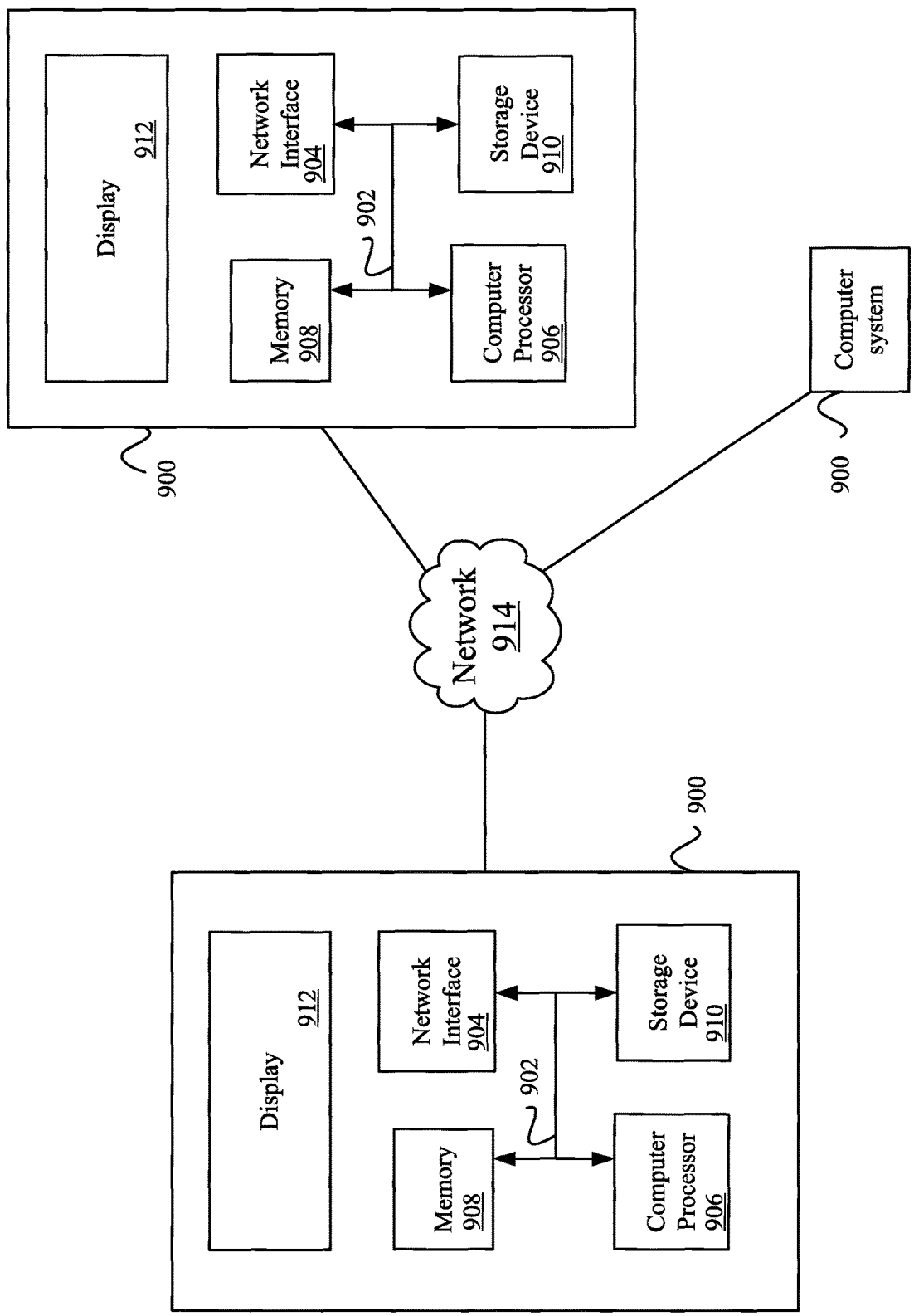
FIG. 9 illustrates an example of special purpose computer systems according to one embodiment.

FIG. 9 illustrates an example of special purpose computer systems 900 according to one embodiment. Computer system 900 includes a bus 902, network interface 904, a computer processor 906, a memory 908, a storage device 910, and a display 912.

Bus 902 may be a communication mechanism for communicating information. Computer processor 906 may execute computer programs stored in memory 908 or storage device 908. Any suitable programming language can be used to implement the routines of some embodiments including C, C++, Java, assembly language, etc. Different programming techniques can be employed such as procedural or object oriented. The routines can execute on a single computer system 900 or multiple computer systems 900. Further, multiple computer processors 906 may be used.

Memory 908 may store instructions, such as source code or binary code, for performing the techniques described above. Memory 908 may also be used for storing variables or other intermediate information during execution of instructions to be executed by processor 906. Examples of memory 908 include random access memory (RAM), read only memory (ROM), or both.

Storage device 910 may also store instructions, such as source code or binary code, for performing the techniques described above. Storage device 910 may additionally store data used and manipulated by computer processor 906. For example, storage device 910 may be a database that is accessed by computer system 900. Other examples of storage device 910 include random access memory (RAM), read only memory (ROM), a hard drive, a magnetic disk, an optical disk, a CD-ROM, a DVD, a flash memory, a USB memory card, or any other medium from which a computer can read.

Memory 908 or storage device 910 may be an example of a non-transitory computer-readable storage medium for use by or in connection with computer system 900. The non-transitory computer-readable storage medium contains instructions for controlling a computer system 900 to be configured to perform functions described by some embodiments. The instructions, when executed by one or more computer processors 906, may be configured to perform that which is described in some embodiments.

Computer system 900 includes a display 912 for displaying information to a computer user. Display 912 may display a user interface used by a user to interact with computer system 900.

Computer system 900 also includes a network interface 904 to provide data communication connection over a network, such as a local area network (LAN) or wide area network (WAN). Wireless networks may also be used. In any such implementation, network interface 904 sends and receives electrical, electromagnetic, or optical signals that carry digital data streams representing various types of information.

Computer system 900 can send and receive information through network interface 904 across a network 914, which may be an Intranet or the Internet. Computer system 900 may interact with other computer systems 900 through network 914. In some examples, client-server communications occur through network 914. Also, implementations of some embodiments may be distributed across computer systems 900 through network 914.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising
   receiving, by a computing device, a request for supplemental content to be displayed in a break of a video being played using a first instance of an application at a first client device, wherein an account is associated with the first instance of the application;
   retrieving, by the computing device, a plurality of contact options that has been associated with the account to receive pull notifications;
   ranking, by the computing device, the plurality of contact options; and
   outputting, by the computing device, a plurality of pull notification options to the first client device based on the plurality of contact options, the plurality of pull notification options being displayed with the supplemental content during the break, wherein:
   a pull notification option causes a pull notification to be sent to a second instance of the application running on a second client device, and
   the pull notification is configured to be output by the second instance of the application on the second client device.

2. The method of claim 1, further comprising:
   receiving a selection of the pull notification option; and
   selecting engagement content for the pull notification option.

3. The method of claim 1, wherein:
   the second instance of the application is opened when the pull notification is selected, and
   the second instance of the application causes an output of engagement content that is associated with the supplemental content.

4. The method of claim 1, wherein an email address for the account and a scannable code that is not associated with the account are included in the plurality of contact options.

5. The method of claim 1, wherein the plurality of contact options is determined based on:
   a first profile for the account is using the first instance of the application, and
   the first profile for the account is using the second instance of the application.

6. The method of claim 1, wherein the plurality of contact options is determined based on:
   a first profile that is using one of the first instance of the application and the second instance of the application, and
   a second profile that is using another one of the first instance of the application and the second instance of the application.

7. The method of claim 1, wherein ranking the plurality of contact options comprises:
   ranking a first contact option for a first profile first, wherein the first profile is using the first instance of the application.

8. The method of claim 7, wherein ranking the plurality of contact options comprises:
   ranking a second contact option for a second profile after the first contact option, wherein the second profile is using a second instance of the application on a third client device.

9. The method of claim 8, wherein ranking the plurality of contact options comprises:
ranking a third contact option for an email address of the account after the first contact option and before the second contact option.

10. The method of claim 8, wherein:
the first instance of the application used the first instance of the application after the second profile used the second instance of the application.

11. The method of claim 9, wherein ranking the plurality of contact options comprises:
retrieving a fourth contact option for a scannable code; and
ranking the scannable code after the second contact option.

12. A non-transitory computer-readable storage medium comprising instructions, that when executed, control one or more computer processors to be operable for:
receiving a request for supplemental content to be displayed in a break of a video being played using a first instance of an application at a first client device, wherein an account is associated with the first instance of the application;
retrieving a plurality of contact options that have been associated with the account to receive pull notifications;
ranking the plurality of contact options; and
outputting a plurality of pull notification options to the first client device based on the plurality of contact options, the plurality of pull notification options being displayed with the supplemental content during the break, wherein:
a pull notification option causes a pull notification to be sent to a second instance of the application running on a second client device, and
the pull notification is configured to be output by the second instance of the application on the second client device.

13. A method comprising
sending, by a computing device, a request for supplemental content to be displayed in a break of a video being played using a first instance of an application at a first client device, wherein an account is associated with the first instance of the application;
receiving, by the computing device, a plurality of pull notification options for the account, wherein the plurality of pull notification options is based on a plurality of contact options that has been associated with the account to receive pull notifications;
ranking, by the computing device, the plurality of pull notification options;
outputting, by the computing device, the plurality of pull notifications with the supplemental content during the break;
receiving, by the computing device, a selection of a pull notification option; and
sending, by the computing device, the selection of the pull notification option to a system, wherein:
the system uses a contact option associated with the pull notification option to send a pull notification to a second instance of the application running on a second client device, and
the pull notification is configured to be output by the second instance of the application on the second client device.

14. The method of claim 13, wherein ranking the plurality of pull notifications comprises:
changing an initial ranking of the plurality of pull notifications.

15. The method of claim 13, wherein ranking the plurality of pull notifications comprises:
ranking a first pull notification for a first profile first, wherein the first profile is using the first instance of the application.

16. The method of claim 15, wherein ranking the plurality of pull notifications comprises:
ranking a second pull notification for a second profile after the first pull notification, wherein the second profile is using a second instance of the application on a third client device.

17. The method of claim 16, wherein ranking the plurality of pull notifications comprises:
ranking a third pull notification for an email address of the account after the first pull notification and before the second pull notification.

18. The method of claim 17, wherein ranking the plurality of pull notifications comprises:
ranking a fourth pull notification for scannable code after the second pull notification.

19. The method of claim 1, further comprising:
retrieving a contact option that is not associated with the account, wherein the contact option is ranked with the plurality of contact options.

20. The method of claim 1, wherein outputting the plurality of pull notifications causes the supplemental content and the plurality of pull notifications to be output at the first client device.

* * * * *